M. D. DOMINGUEZ.
ELECTRICAL WATER HEATER.
APPLICATION FILED SEPT. 21, 1921.
1,437,046.
Patented Nov. 28, 1922.
2 SHEETS—SHEET 2.
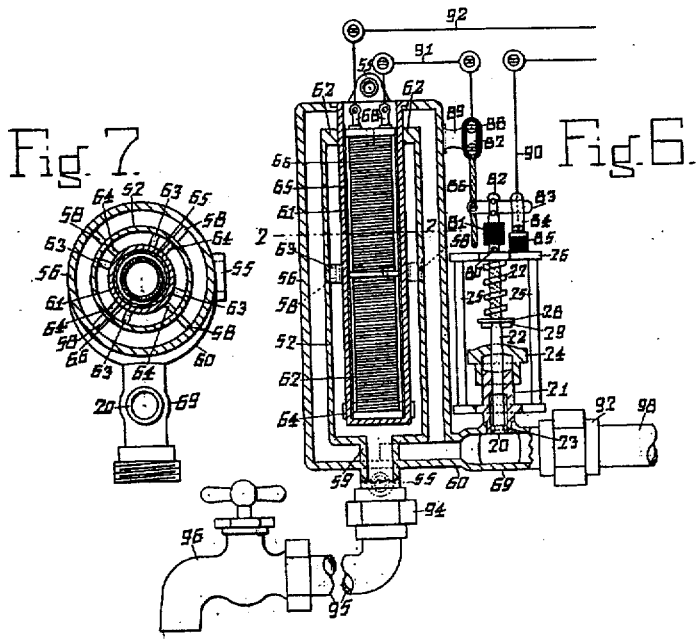
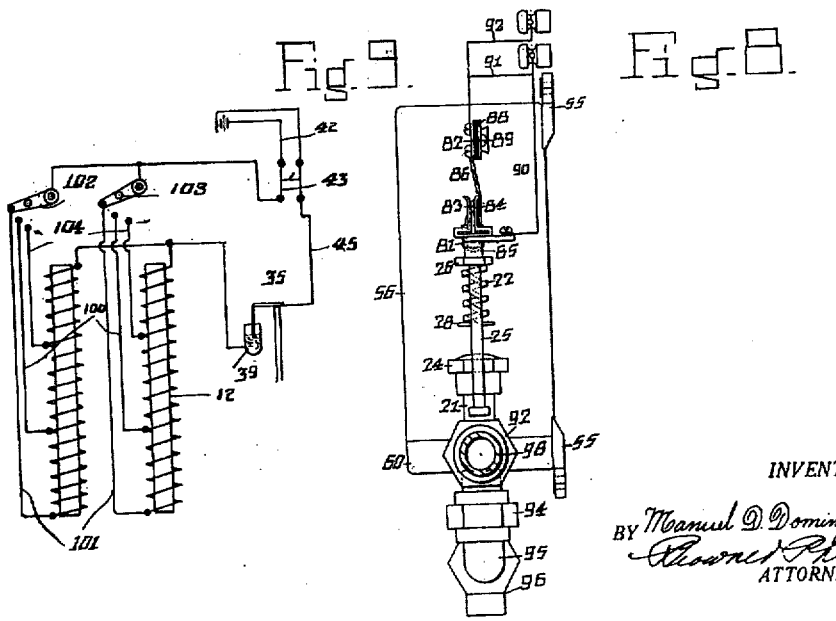
INVENTOR.
BY Manuel D. Dominguez
ATTORNEYS.

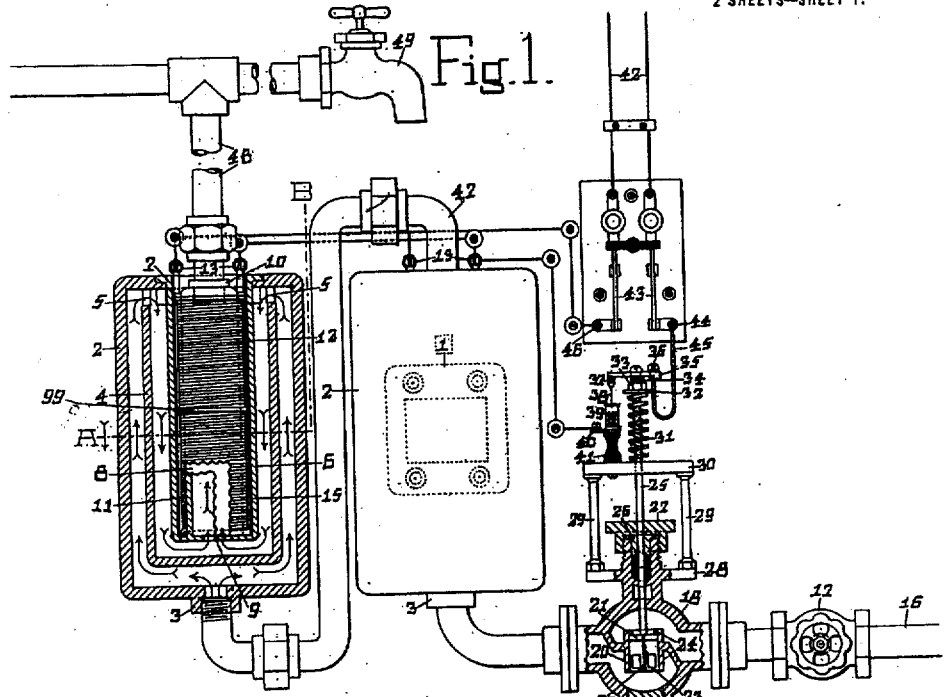
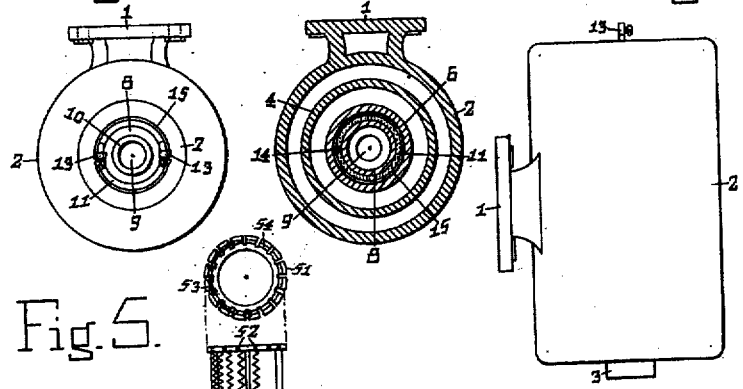
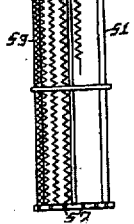

Patented Nov. 28, 1922.

1,437,046

UNITED STATES PATENT OFFICE.

MANUEL D. DOMINGUEZ, OF NEW ORLEANS, LOUISIANA, ASSIGNOR OF ONE-HALF TO JUAN ARGOTE, OF NEW ORLEANS, LOUISIANA.

ELECTRICAL WATER HEATER.

Application filed September 21, 1921. Serial No. 502,115.

*To all whom it may concern:*

Be it known that I, MANUEL D. DOMINGUEZ, a subject of the King of Spain, residing at New Orleans, in the parish of Orleans and State of Louisiana, have invented certain new and useful Improvements in Electrical Water Heaters, of which the following is a specification.

The invention relates to electrical water heaters, and has as an object the provision of a device of this nature which shall be automatic in its action, so that it is only necessary to start the flow of water to cause the same to be heated and to flow from the outlet in this condition.

An illustrative embodiment of the invention is shown in the accompanying drawings in which—

Fig. 1 is a front elevation, partly in section, of the device;

Fig. 2 is a detail plan view of one of the heating elements;

Fig. 3 is a detail horizontal section on line A—B Fig. 1;

Fig. 4 is a detail side elevation of one of the heater element casings;

Fig. 5 is a detail view of a modified form of the heating element showing the side view and a plan view thereof;

Fig. 6 is a detail front elevation partly in central vertical section showing a modified form of heater and switch;

Fig. 7 is a horizontal section on line 7—7 of Fig. 6;

Fig. 8 is a detail side elevation of the structure shown in Fig. 6; and

Fig. 9 is a diagram of circuits for giving different heats.

The heating elements provided by the system are each preferably mounted on a base 1 which may be attached to any suitable support, and are enclosed in a casing 2 having a perforated and internally threaded boss 3 at the bottom for attachment of a water pipe.

The casing 2 is shown in the form of a cylinder being enclosed at top and bottom and provided with an opening at the upper portion for the reception of the flange 7 on an internal cylinder to be described.

Concentric with the cylinder 2 is shown a second cylinder 4 which is entirely closed at the bottom, and is provided with openings 5 at its top for passage of water, being supported from the top wall of the cylinder 2 by means of the spaces between the openings 5, which portions are secured to the end wall of the cylinder 2.

To contain the heating element the cylinder 6 is provided, which bears the flange 7 at the top thereof, fitting into the end wall of the cylinder 2, having concentric therewith the inner cylinder 8, the space between cylinders 6 and 8 being closed at the lower end. An opening 9 into the space within the inner cylinder 8 is provided for the flow of water. Water entering through the pipe connected to the boss 3 must therefore flow upwardly between cylinders 2 and 4 through the openings 5, in contact with the outer surface of the cylinder 6 downwardly, through the opening 9, and upwardly in contact with the inner surface of cylinder 8, and will then pass out the opening 10, into which opening the pipes 47 or 48 are threaded.

The resistance element 12 shown in Fig. 1 is contained in the space between cylinders 6 and 8, and therefore heats the walls of both of these cylinders. This resistance element is preferably formed of nickel or an alloy thereof providing a suitable resistance to become heated upon the passage of an electric current therethrough. To carry the heating element a porcelain spool 11 is preferably provided upon which the heating element may be wound, or the element may be preformed and placed upon the spool afterwards. Preferably a mica insulating sleeve 15 is supplied surrounding the resistance element for the purpose of insulating the same. The resistance element may be used as a whole, or it may be connected so as to be used in sections, as shown in Fig. 9 to be described hereafter. The ends of the resistance element are shown connected to poles 13, to which the wires supplying current to the device may be attached. If desired the porcelain spool 11 may be provided with a longitudinal passageway 14 formed in its wall for the passage of the wire from the terminal 13 to the end of the heating element at the lower end of the spool. The spool 11 preferably, in addition to collars at the end thereof to enclose the heating element, is provided with a collar 99 at its center, the collars being slightly greater in extent than the thickness of the heating element, so that the mica sleeve 15 will be slightly spaced from the heating element thereby.

The main supply pipe for the water to be heated by the device is shown at 16, and is provided with a cut off valve at 17. To provide for automatic action of the heating element a valve 18 is connected in the supply pipe, which valve is provided with a removable plug 19 to give access to its interior. Within the valve 18 is a cylinder 20 having openings 23 at its lower portion and at 24 a flange or inwardly projecting radial sections thereof to limit the upward travel of the disk 21. To prevent rotation of the disk 21 a rib 22 is formed integral with the wall of the cylinder 20 and a groove is provided in the disk 21 to coact therewith.

Extending upwardly from the disk 21 is a plunger rod 25 which emerges from the casing of the valve 18, through a stuffing box 26—27 of well known form. To support the switch member for control of the current there are shown arms 28, preferably formed integral with a portion of the valve casing 18 upon which arms are supported posts 29, having the cross-bar 30 through a perforation in which the plunger rod 25 works and by which it is guided. A spring 31 bears upon the bar 30 and against washer 32 held by a nut 33 threaded upon the plunger rod 25 to hold the plunger rod and disk 21 normally in its uppermost position. When water is allowed to flow because of the opening of an outlet faucet of the system the pressure being relieved within the heating elements will result in unbalanced pressure upon the disk 21, and cause the same to descend with compression of spring 31 until the water flows out of the openings 23.

Carried by the upper end of plunger 25 and insulated therefrom by means of an insulating element 34 is a cross-bar 35 carrying at one end a binding screw 36 for attachment of a flexible conductor 45. Mounted upon the other end of the bar 35 is a needle 38 secured to said bar at 37 and projecting into a mercury cup 39, preferably of glass, which cup is supported upon the bar 30 by an insulating element 41. A terminal 40 has electrical connection with the mercury in the cup 39, and provides attachment for the wiring to the heating elements.

Preferably the surface of the mercury in the cup 39 is covered with an inert substance, such as glycerine, to prevent oxidization.

The current to the system is received through wires 42 to the main cut-out 43. From pole 46 a wire is conducted to one terminal of each of the resistance elements 12 which are connected in parallel therewith. From the other terminal a wire is connected to the terminal 40. The pipe 48 may be connected to any number of outlet faucets arranged in any desired location, and when none of the faucets are open the pressure on the two sides of disk 21 will be balanced and the spring 31 will hold the switch 38—39 open. As soon however as faucet 49 is opened disk 21 will be depressed to close the switch 38—39, and cause the heating elements to be heated to thereby warm the water. Leakage about disk 21 will allow the switch to be opened when the faucets 49 have been closed.

A modified form of heating element is shown in Fig. 5, which comprises a porcelain skeleton support comprising longitudinal rods 51 having annular end pieces provided with radial grooves 52 connected in the surface of the annular member by a circular groove 54 in which the wire connecting the longitudinal helices 53 may lie so as to bring them below the surface of the annular members. With this form of device it is possible to cause the two terminals of the heating element to lie at the same end of the support so as to render unnecessary such an expedient as the passage 14 in Fig. 3.

While Fig. 1 illustrates two heating devices arranged in parallel electrically and for the fluid to pass therethrough in series, it will be understood that any number greater than two may be used, or if desired one only, depending upon the service required.

The modified form of device shown in Fig. 6 comprises attaching member 55 to be secured to a suitable support. An external cylinder 56 having concentric therewith a second cylinder 57 which is shown as provided with radial elements 58 to space the same from the outer cylinder 56, and with an end member 59 passing to the end wall of the cylinder 56, to provide an opening therethrough for the attachment of the water outlet.

A third concentric cylinder 61 is shown as contained within cylinder 57 and spaced therefrom by means of radial elements 62, 63 and 64 carried by cylinder 57. Radial elements 62 are located upon the end of said cylinder 57 and are spaced apart to provide for free passage of water to the interior of cylinder 57. The elements 63 and 64 are placed respectively at the center and at the lower end of the cylinder 61. The cylinder 57 is closed at its lower end and is open at its upper end, being provided with a flange to seat within the end wall of the cylinder 56. The liquid does not have access to the interior of the inner cylinder 61 which contains only the heating element.

An inlet pipe 60 is preferably formed integral with the wall of the cylinder 56 for passage of the water supply thereto.

The heating element shown in Fig. 6 comprises an unglazed porcelain element 66 which is shown as hollow and closed at its upper part and carrying a spiral helix 67, being insulated from the cylinder 61 by means of a mica sleeve 65. The terminals for the heating element are shown at 68 to which the wires 91—92 are connected.

To operate the switch in this form of the device a plunger 70 is seated in a recess communicating with the fluid passage 69. The plunger rod 72 connected with said plunger passes out through a stuffing box 74 and is held in the position shown in Fig. 6 by means of a spring 77 having abutment against bar 76 supported by posts 75 from the body of the stuffing box, and having action upon the plunger rod 72 by means of a washer 78 secured thereto. To limit the downward movement of the plunger rod 72 a pin 80 is shown impinging upon the bar 76. Carried by the upper end of the plunger rod 72 is a bar 83 passing through a loop 82 from the plunger rod 72 by means of an insulating element 81.

Blades 84 are supported upon the bar 76 by means of an insulating element 85 and have an electric binding screw connected therewith, as shown in Fig. 8. To the other end of the bar 83 a flexible conductor 86 is connected, being attached to a connecting bar 87 and insulating therefrom by means of an insulating element 88. Wires 91—92 connect the terminals 68 with the switch 83—84 and with the current supply.

Outlet faucets 96 which may be of any number of locations are shown connected to the device by means of the pipe 95 and a union at 94. The water supply pipe 98 is shown also connected to the device by means of a union 97. When the outlet faucets 96 are all closed the interior of the device will be under water supply system pressure, and the plunger 70 will be pressed back into its cylinder, thereby opening the switch 83—84 and cutting off the current from the heating element. When any faucet is open the pressure within the casing of the device will be reduced, allowing the spring 77 to close the circuit, to thereby heat the water which flows through the device. If it is desired to make the degree of heat supplied to the water controllable the circuits shown in Fig. 9 may be adopted wherein the resistance elements 12 are shown as provided with connections 104—100 and 101, dividing the element into thirds. By manipulation of the switch arms 102—103 any desired portion of the elements 12 may be utilized with consequent change in the temperature supplied to the water.

Minor changes may be made in the physical embodiment of the invention without departing from its spirit.

What I claim is:

1. An electrical water heater comprising, in combination, a reservoir comprising side and end walls, a cylinder within said reservoir having a closed and an open end the open end spaced from one end wall of said reservoir, said reservoir having an opening in said last named end wall, a cylinder seated in said opening, an electrical heating element in said last named cylinder, means for admitting water to said reservoir exterior of said first named cylinder and means for egress of water from said cylinder adjacent its closed end.

2. An electrical water heater comprising, in combination, a reservoir, having side and end walls and an opening in one end wall, a cylinder within said reservoir closed at one end and having its open end spaced from an end wall of said reservoir, a cylinder seated in said opening with its end adjacent the closed end of said first named cylinder, a cylinder concentric with said second named cylinder to provide an annular space closed at its inner end, an electrical resistance element in said space, a water inlet pipe admitting water to said cylinder, a water outlet pipe connected to said last named cylinder.

MANUEL D. DOMINGUEZ.